(12) United States Patent
Duckett et al.

(10) Patent No.: US 10,855,809 B2
(45) Date of Patent: Dec. 1, 2020

(54) PRINTER WITH DUAL MEDIA ACCESS CONTROL INTERFACES AND UNINTERRUPTED INTERFACE CHANGE

(71) Applicant: Avery Dennison Retail Information Services LLC, Mentor, OH (US)

(72) Inventors: Jeanne F. Duckett, Franklin, OH (US); Mark Morrow, Kettering, OH (US); Nikkolus Wortham, Liberty Township, OH (US)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 506 days.

(21) Appl. No.: 15/443,393

(22) Filed: Feb. 27, 2017

(65) Prior Publication Data

US 2017/0251079 A1 Aug. 31, 2017

Related U.S. Application Data

(60) Provisional application No. 62/300,110, filed on Feb. 26, 2016.

(51) Int. Cl.
*H04L 29/08* (2006.01)
*H04L 29/12* (2006.01)
*H04W 84/12* (2009.01)
*H04W 36/14* (2009.01)

(52) U.S. Cl.
CPC .......... *H04L 67/34* (2013.01); *H04L 61/2015* (2013.01); *H04L 61/2084* (2013.01); *H04L 61/6077* (2013.01); *H04W 36/14* (2013.01); *H04W 84/12* (2013.01)

(58) Field of Classification Search
CPC .......... H04L 61/2015; H04L 29/12226; H04L 29/02; H04L 29/12367; H04L 61/2514; H04L 61/6077; H04L 67/34; H04L 61/2084; G06F 3/1236; G06F 3/1288; G06F 3/1231; H04W 36/14; H04W 84/12
See application file for complete search history.

(56) References Cited

U.S. PATENT DOCUMENTS 6,240,464 B1 * 5/2001 Fijolek ................ H04L 12/2801
370/351
2003/0005100 A1 * 1/2003 Barnard ............ H04L 29/12113
709/223

(Continued)

FOREIGN PATENT DOCUMENTS

EP 1694036 8/2006

OTHER PUBLICATIONS

International Search Report and Written Opinion dated May 12, 2017 for International Application No. PCT/US2017/019647 filed Feb. 27, 2017.

(Continued)

*Primary Examiner* — Oanh Duong

(57) ABSTRACT

A printer has first and second interfaces for connecting to first and second networks having first and second data host configuration protocol servers. The first and second interfaces have differing media access control (MAC) addresses. The printer uses a recovery sequence to enable recovery for a host computer running an application when switching from the first printer interface to the second printer interface.

14 Claims, 7 Drawing Sheets

(56) References Cited

U.S. PATENT DOCUMENTS

| | | | | |
|---|---|---|---|---|
| 2003/0043781 A1* | 3/2003 | Proctor | ............ | H04L 29/12311 370/352 |
| 2003/0145073 A1* | 7/2003 | Lee | ................... | H04L 29/12301 709/223 |
| 2005/0021855 A1* | 1/2005 | Wang | ................. | H04L 61/2015 709/245 |
| 2006/0206597 A1* | 9/2006 | Kim | .................. | H04L 29/12311 709/220 |
| 2006/0248229 A1* | 11/2006 | Saunderson | ........ | H04L 12/4641 709/245 |
| 2008/0098084 A1* | 4/2008 | Volz | .................. | H04L 29/12066 709/217 |
| 2010/0027054 A1* | 2/2010 | Reddy | ............... | H04N 1/00233 357/1.15 |
| 2010/0103936 A1* | 4/2010 | De Cnodder | ....... | H04L 12/2892 370/392 |
| 2013/0148161 A1* | 6/2013 | Park | ................... | H04N 1/00204 358/1.15 |
| 2013/0250355 A1* | 9/2013 | Takamiya | .......... | H04N 1/32117 358/1.15 |
| 2016/0088093 A1* | 3/2016 | Yung | .................... | H04L 67/145 709/227 |
| 2016/0315874 A1* | 10/2016 | Medovich | ........... | G06F 12/1009 |
| 2017/0308334 A1* | 10/2017 | Doyle, Sr. | ............. | G06F 3/1207 |

OTHER PUBLICATIONS

Gundavelli et al., "proxy Mobile IPv6; rfc5213.txt" Internet Engineering Task Force, IETF; Standard, Internet Society (ISOC) 4, Rue Des Falaises CH-1205 Geneva, Switzerland, Aug. 1, 2008.

International Search Report and Written Opinion dated Aug. 28, 2018 for International Application No. PCT/US2017/019647 filed Feb. 27, 2017.

* cited by examiner

PRINTER WITH DUAL MEDIA ACCESS CONTROL INTERFACES AND UNINTERRUPTED INTERFACE CHANGE

CLAIM OF PRIORITY

This application claims priority to U.S. Provisional Patent Application No. 62/300,110, filed Feb. 26, 2016, the contents of which are hereby incorporated by reference.

BACKGROUND

Field of the Disclosure

The present disclosure relates generally to printer devices and, in particular, to a network printer that does not require a power cycle to switch between interfaces of the printer.

Description of Related Art

Modern printers that are used in computer networks typically have multiple interface devices with each supporting a media access control ("MAC") address. Each such interface would typically be assigned its own Internet protocol ("IP") address. A host computer networked with the printer and running an application experiences difficulty when the printer interface is changed via the host application. A typical application program would need to close the socket or port to the printer and reopen the socket or port with the new printer interface IP address.

For a typical industrial printer there may be multiple interfaces having different physical layers such as an IEEE 802.11 a/b/g/n specification (wireless) layer or an IEEE 802.3 specification (Ethernet) layer. In a typical point to point application, only one of these interfaces would be attached to a host connection at a time. It therefore may be convenient for a user to switch between the 802.3 and the 802.11 printer interfaces, using the host application, and have it appear seamless to the host application.

One method for seamlessly changing printer interfaces using a host application is to use MAC address suppression. The printer with multiple interfaces, with each having a physical address layer with its own MAC address, will suppress all MAC address transmissions by the printer except the MAC address designated to be the client MAC address (for instance, the MAC address on the 802.3 interface), that is, the selected interface, by the host application.

Computer networks often use Dynamic Host Configuration Protocol (DHCP) whereby a DHCP server of the network dynamically distributes network configuration parameters, such as IP addresses for interfaces. Use of DHCP enables a printer, computer or other device connected to the network to request an IP address and networking parameters automatically, without manual configuration by a network administrator or other user.

A simplified diagram illustrating operation between a client computer, printer or other device and a DHCP server is presented in FIG. 1. As illustrated at 20, the client, when joined to the network and powered on, broadcasts a Discovery request, including the clients MAC address and requesting an IP address. In response, as illustrated at 22, the server broadcasts an Offer (or "lease offer") to the client device, which includes the IP address that the server is offering, the lease duration, the subnet mask, and the IP address of the DHCP server. As shown at reference numeral 24, in response to the Offer, the client broadcasts a Request for the offered IP address and additional network parameters. When the server receives the Request message from the client, it broadcasts an Acknowledgement 26 to the client including the lease duration and any other configuration information requested by the client. This concludes the network configuration process for the client device.

Prior art printers connected to a network that uses DHCP as the boot method fail to maintain connectivity with a host computer running an application when the printer interface and associated subnet are changed via the host application. As a result, the printer will require a power cycle (i.e. turned off then back on) to resend the discovery command 20 of the DHCP process of FIG. 1 to reconnect to the host computer.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a method for changing from a first interface of a printer to a second interface of a printer, where the first and second interfaces have different media access control addresses is provided. The method includes connecting the first interface of the printer to a first network having a first data host configuration protocol server, sending a DHCPDiscover message from the printer to the first server, receiving a DHCPOffer message from the first server using the printer including a first IP address, sending a DHCPRequest message from the printer to the first server accepting the first IP address, receiving a DHCPAck message from the first server using the printer, connecting the second interface of the printer to a second network having a second data host configuration protocol server, sending a DHCPRequest message from the printer using the hardware address of the first interface to the second server accepting the first IP address, determining if an DHCPAck message has been received by the printer from the second server and setting a timeout time if the DHCPAck message has not been received, upon expiration of the timeout time, sending a DHCPDiscover message from the printer to the second server, receiving a DHCPOffer message from the second server using the printer including a second address, sending a DHCPRequest message from the printer to the first server accepting the second IP address and receiving a DHCPAck message from the second server using the printer.

In a further aspect, a method is provided for obtaining an IP address for a printer having a first interface and a second interface, where the first and second interfaces have different media access control addresses, from a data host configuration protocol server upon reconfiguring the printer from the first interface to the second interface. The method includes sending a DHCPRequest message from the printer to the server, determining if an DHCPAck message has been received from the server and setting a timeout time if the DHCPAck message has not been received, upon expiration of the timeout time, sending a DHCPDiscover message from the printer to the server, receiving a DHCPOffer message from the server using the printer including the IP address, sending a DHCPRequest message from the printer to the server accepting the IP address and receiving a DHCPAck message from the server using the printer.

In another aspect, a system for printing includes a first network including a first data host configuration protocol server, a second network including a first data host configuration protocol server, a printer having a first interface configured to selectively connect to the first network and a second interface configured to selectively connect to the second network. The printer also configured to send a DHCPDiscover message to the first server, receive a DHCPOffer message from the first server including a first IP address, send a DHCPRequest message to the first server accepting the first IP address, receive a DHCPAck message from the first server, send a DHCPRequest message to the second server accepting the first IP address, determine if an DHCPAck message has been received from the second server and set a timeout time if the DHCPAck message has not been received, upon expiration of the timeout time, send a DHCPDiscover message from the printer to the second server, receiving a DHCPOffer message from the second server including a second address, send a DHCPRequest message to the first server accepting the second IP address and receive a DHCPAck message from the second server using the printer.

In still another aspect, a printer has a first interface configured to selectively connect to a first network having a first data host configuration protocol server and a second interface configured to selectively connect to a second network having a second data host configuration protocol server. In addition, the printer includes a control system configured to send a DHCPDiscover message to the first server, receive a DHCPOffer message from the first server including a first IP address, send a DHCPRequest message to the first server accepting the first IP address, receive a DHCPAck message from the first server, send a DHCPRequest message to the second server accepting the first IP address, determine if an DHCPAck message has been received from the second server and set a timeout time if the DHCPAck message has not been received, upon expiration of the timeout time, send a DHCPDiscover message from the printer to the second server, receive a DHCPOffer message from the second server including a second address, send a DHCPRequest message to the first server accepting the second IP address and receive a DHCPAck message from the second server using the printer.

In still another aspect, a printer has a first interface and a second interface, where the first and second interfaces have different media access control addresses. The printer also has a control system configured to send a DHCPRequest message to a server, determine if an DHCPAck message has been received from the server and set a timeout time if the DHCPAck message has not been received, upon expiration of the timeout time, send a DHCPDiscover message to the server, receive a DHCPOffer message from the server including an IP address, send a DHCPRequest message to the server accepting the IP address and receive a DHCPAck message from the server.

BRIEF DESCRIPTION OF THE DRAWINGS

These, as well as other objects and advantages of the disclosure, will be more completely understood and appreciated by referring to the following more detailed description of the presently preferred exemplary embodiments in conjunction with the accompanying drawings, of which.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

This disclosure provides a printer that uses a recovery sequence to enable recovery for a host computer running an application when switching from one subnet connected to a first printer interface to a different subnet connected to a second printer interface. While the invention is described below with respect to a printer having two interfaces, the printer may have a greater number of interfaces. In addition, when the term "network" is used herein, it is to be understood that subnetworks or subnets are also included, and vice-versa.

In accordance with an embodiment of the disclosure, a printer includes an IEEE 802.11 a/b/g/n specification interface and an IEEE 802.3 specification interface, and the associated port and/or connector. While the invention is discussed in terms of a printer having these types of interfaces, the printer may alternatively have interfaces complying with alternative specifications.

Figure 1:
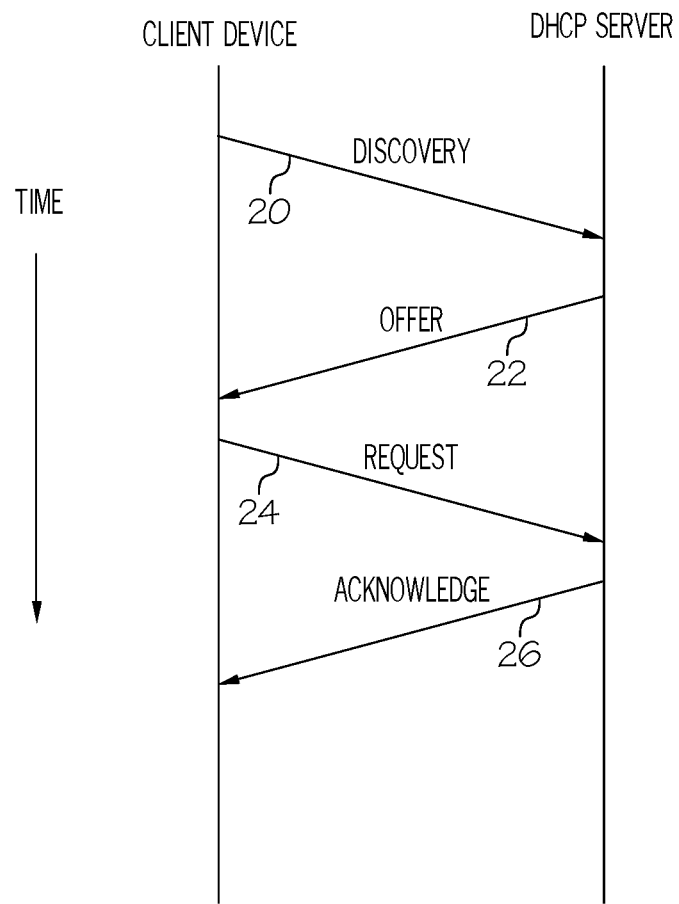
FIG. 1 shows a message flow between a client and a server of a prior art network using Dynamic Host Configuration Protocol as the boot method.
Figure 2:
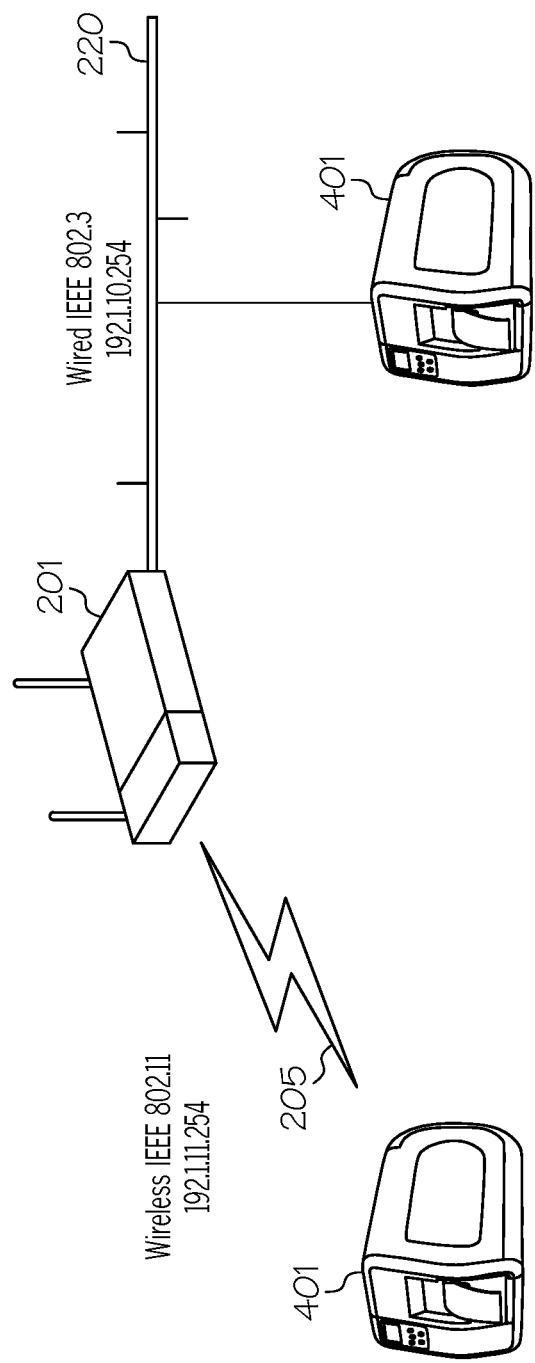
FIG. 2 is a network diagram with a router connected to a printer having wireless (802.11) and Ethernet (802.3) interfaces on different subnets.

With reference to FIG. 2, a printer 401 features an 802.11 wireless interface that is in communication with a network DHCP router 201 via a network 205 using subnet 192.1.11. The printer 401 also features an 802.3 Ethernet interface that is using a network 220 having subnet 192.1.10 to communicate with the DHCP router 201. Router 201 allocates IP addresses on the different subnets depending upon the physical medium (wireless or wired connection). When the printer 401 is powered on and configured to use the wireless interface, it will receive an IP address starting with 192.1.11.X from DHCP router 201 for the wireless network 205. When the printer is powered on and configured to use the Ethernet interface, it will receive an IP address starting with 192.1.10.X from DHCP router 201 for the Ethernet connection 220.

Figure 3:
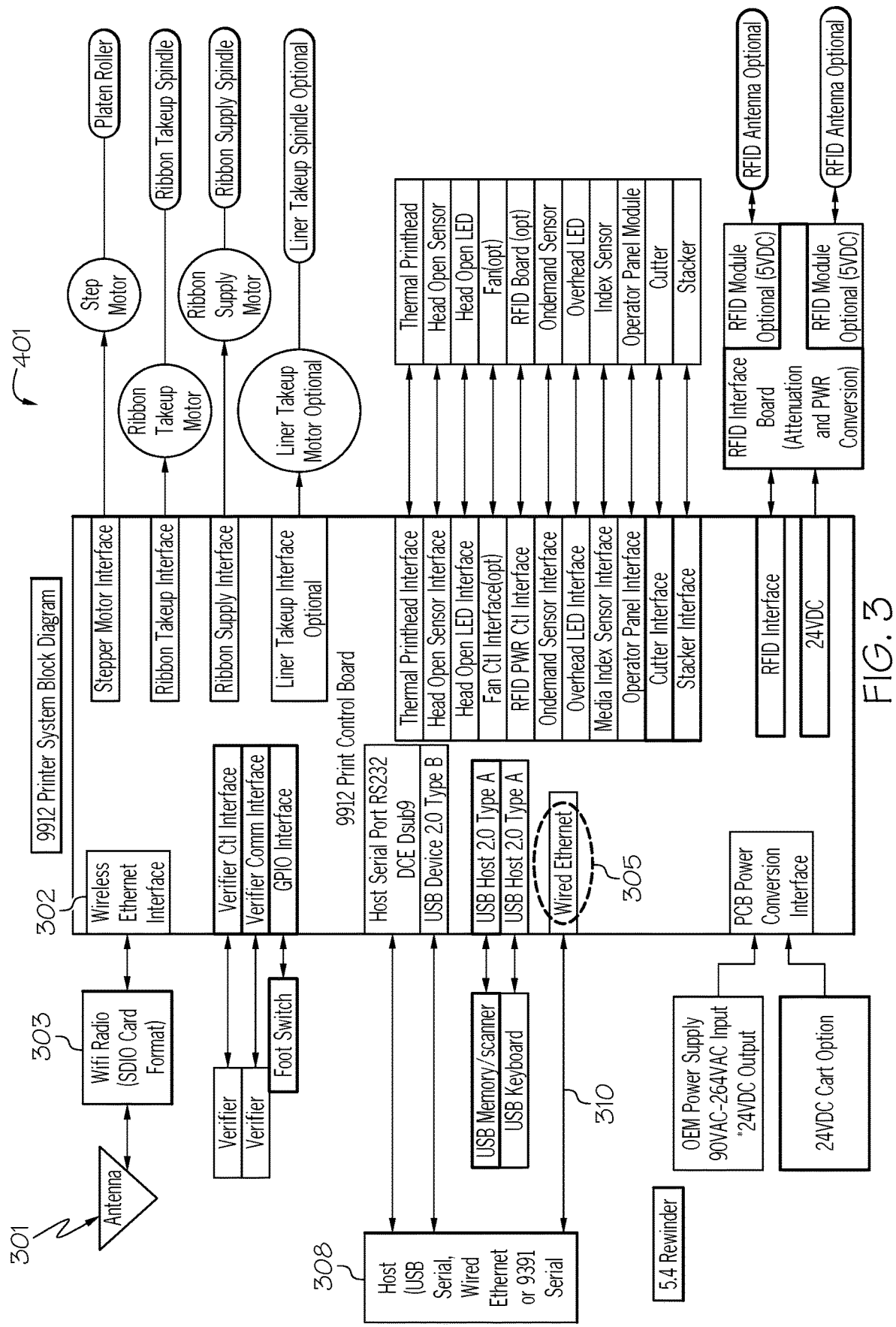
FIG. 3 is a block diagram of the control board and system of the printer of FIG. 2.

An example of a control board and control system for the printer 401 of FIG. 2 is presented in FIG. 3. An antenna 301, which communicates with a Wireless Ethernet Interface 302 via a WiFi card 303 provides the physical interface for the 802.11 a/b/g/n wireless network, while the port 305 provides the physical interface the 802.3 Ethernet network. A host computer 308 running an application that may be used to change the interface (physical medium) of the printer is shown in FIG. 3 connected to port 305 of the 802.3 interface via Ethernet connection 310. The host application of the computer 308 may be used to change the physical medium to wireless communication with the printer via the antenna 301 of the 802.11 interface.

Figure 4:
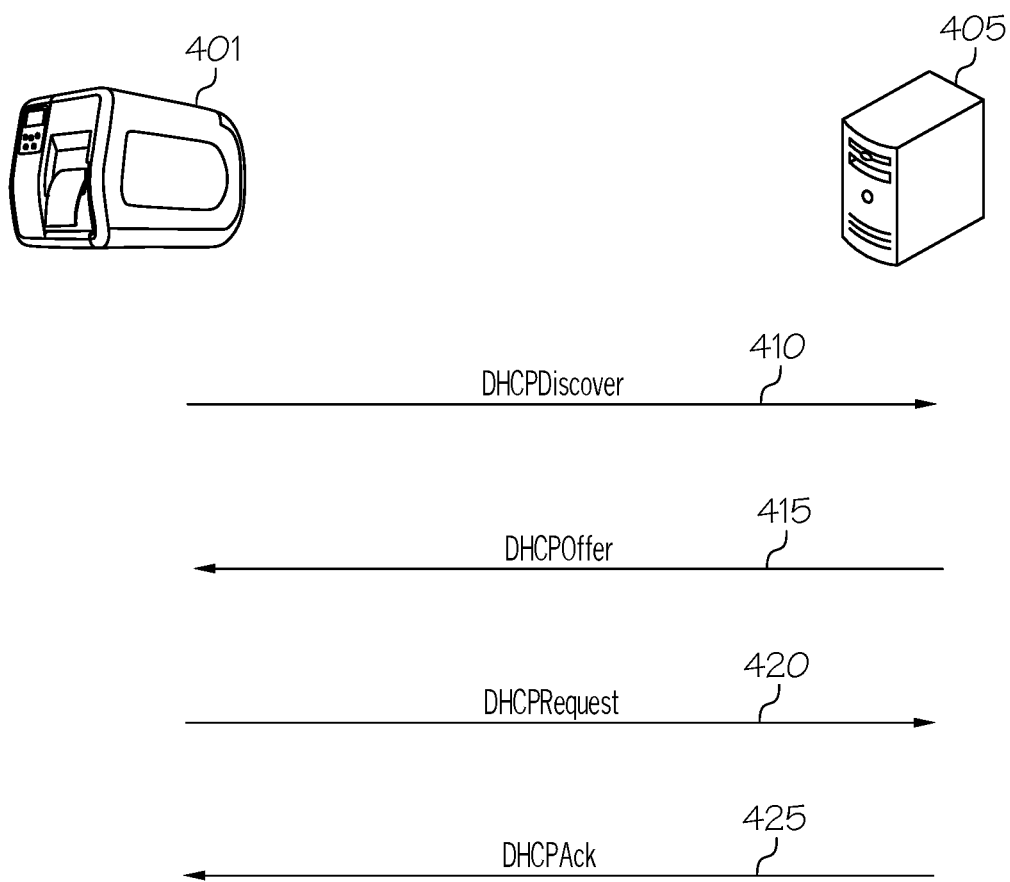
FIG. 4 shows a message flow between Dynamic Host Configuration Protocol server and the printer of FIGS. 2 and 3 in accordance with an embodiment of the disclosure.

In FIG. 4 the detailed message passing from the printer 401 to a DHCP server 405 (which may also be the router 201 of FIG. 2) on either network 205 or network 220 of FIG. 2 is shown. Starting with 410, the printer will typically issue a DHCPDiscover message after the power on sequence is initiated. If the DHCP server 405 receives a successful request from the printer, the DHCP server will send the DHCPOffer 415 message containing the IP address. The printer will respond with DHCPRequest 420 message to request other network parameters that the server may offer. The DHCPServer will respond with DHCPAck 425 message containing the IP address. The DHCPAck message completes the process of the printer obtaining an IP address from a DHCP server for a network.

Figure 5:
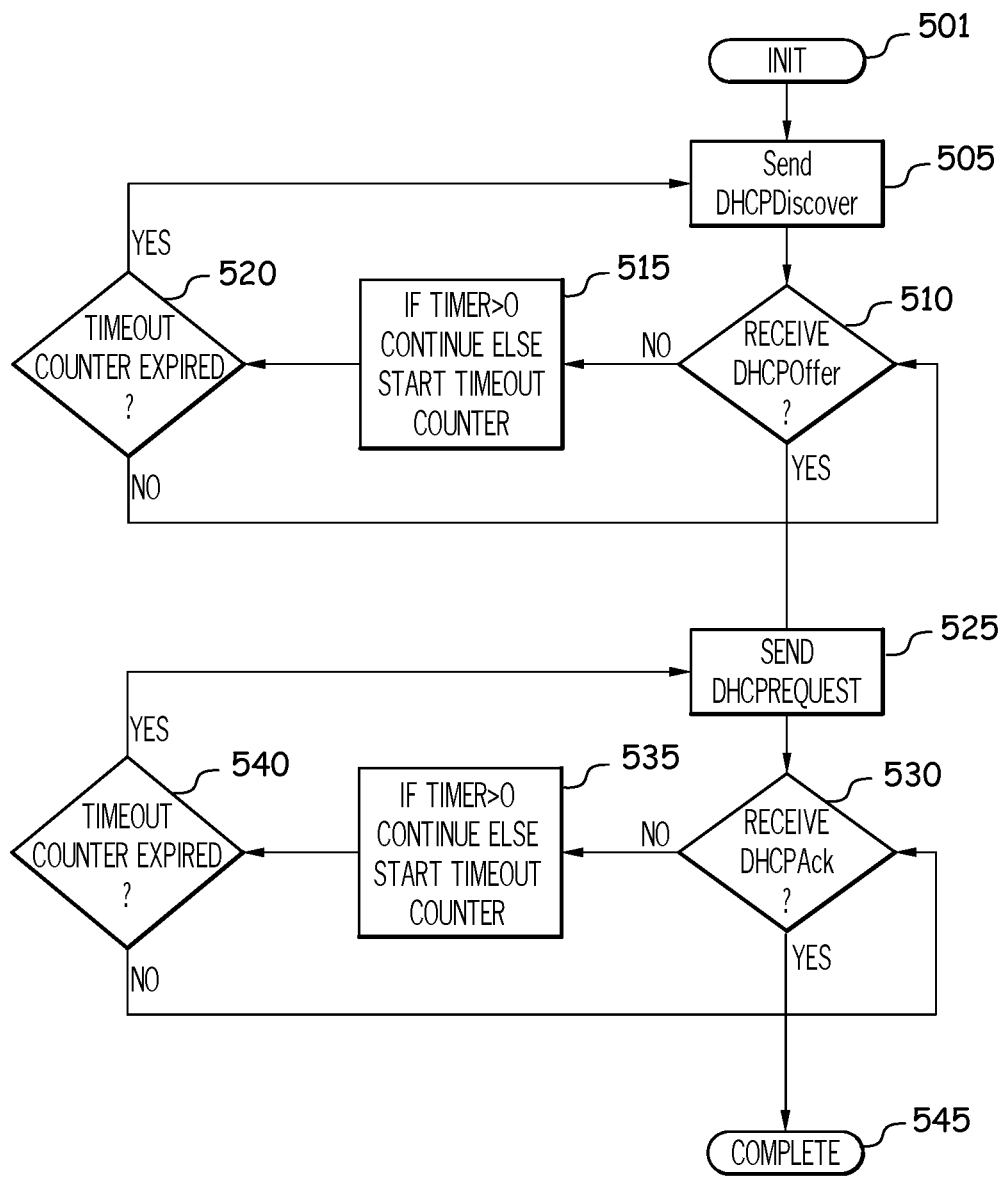
FIG. 5 is a flow chart showing acquisition of an IP address by a printer using DHCP from initial printer power-up.

In FIG. 5 the process of the printer 401 (FIGS. 2 and 4) acquiring an IP address from a DHCP server (such as router 201 of FIG. 2 or the DHCP server 405 of FIG. 4) at power-up is shown. At step 501, the printer 401 and its IP stack are initialized. As the IP stack continues to initialize at step 505, the printer 401 sends the DHCPDiscover to the server 405. At step 510, the printer 401 determines if the DHCPOffer response from the server 405 has been received. If the DHCPOffer was received, at step 525 the printer 401 sends the DHCPRequest to the server 405. If no response is received, at step 515 a timeout counter is started. If the timer is running already, nothing is done. If the time out counter expires (the counter can be different values for different physical interfaces), at step 520, the process returns to block 505 and the DHCPDiscover is resent. If the timer has not expired, the process returns to step 510 to determine if the DHCPOffer was received.

At step 530, the printer 401 determines if the DHCPAck has been received. If the DHCPAck has been received in step 530, the printer continues to step 545 and the IP stack initialization is complete. If, at step 530, the DHCPAck has not been received, a timeout counter is started at 535.

At step 540, the determination is made if the counter is expired. If the counter is expired, the printer returns to 525 and reissues the DHCPRequest. If the timer has not expired, the printer returns to 530 to determine if the DHCPAck has been received. At step 545, the printer completes the IP stack initialization and the DHCP IP address acquisition is complete.

Figure 6:
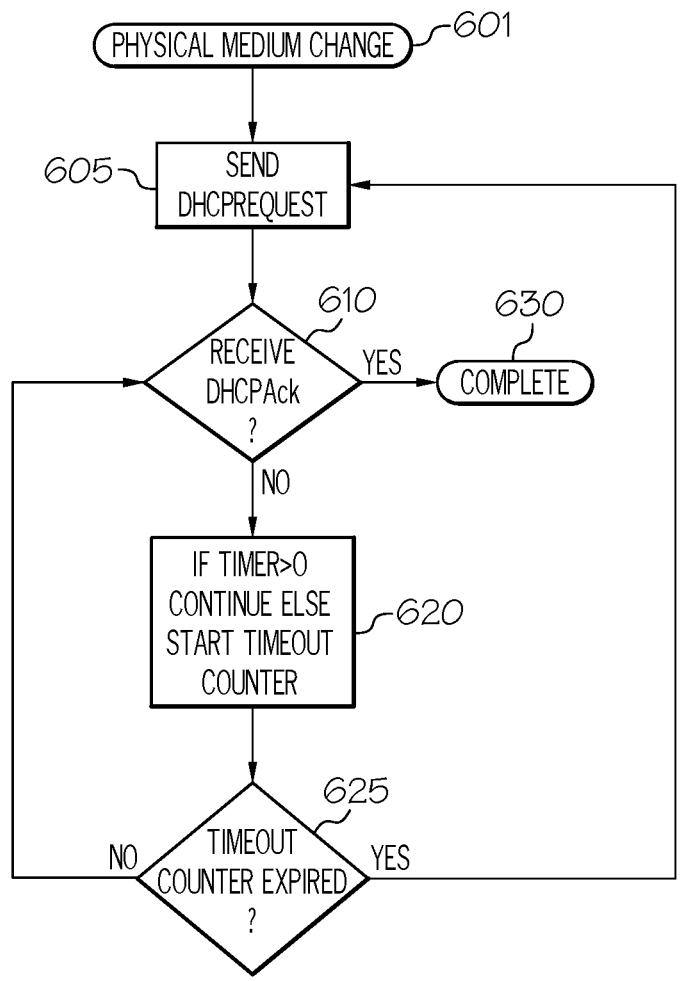
FIG. 6 is a flow chart showing acquisition of an IP address by a printer using DHCP with no timeout recovery.

The process in FIG. 6 reviews the flow if printer 401 needs to reissue the DHCPRequest. A DHCPRequest is done to verify the IP address when the physical medium changes from the 802.11 wireless network (205 in FIG. 2) to the 802.3 Ethernet network (220 in FIG. 2). This process is similar to FIG. 5 in the initialization of the IP Stack with the process starting at 601 but does not start with the DHCPDiscover. At 605, the printer 401 sends the host 405 a DHCPRequest. At 610, the printer 401 checks as to whether a DHCPAck has been received and, if yes (such as when the printer interfaces for physical mediums have the same MAC address), the process completes at 630. If the printer 401 did not receive a DHCPAck at 610, a timeout timer is started at step 620. If the timer is already running, nothing is done at 620. It is important to note that a timeout timer can have a different value depending on the physical medium. At step 625, if the timer is not expired, the process returns to step 610 to determine if a DHCPAck has been received. If the timer is expired, the path follows to step 605 and the DHCPRequest is resent.

When the DHCPRequest is resent when the physical mediums change (from wireless network 205 to Ethernet network 220 of FIG. 2), and the associated printer interfaces have different MAC addresses, the DHCPRequest will not receive a DHCPAck from server 405 and printer 401 will not obtain an IP address. In order to resolve this printer 401 must be power cycled (i.e. the printer power turned off and then turned back on).

Figure 7:
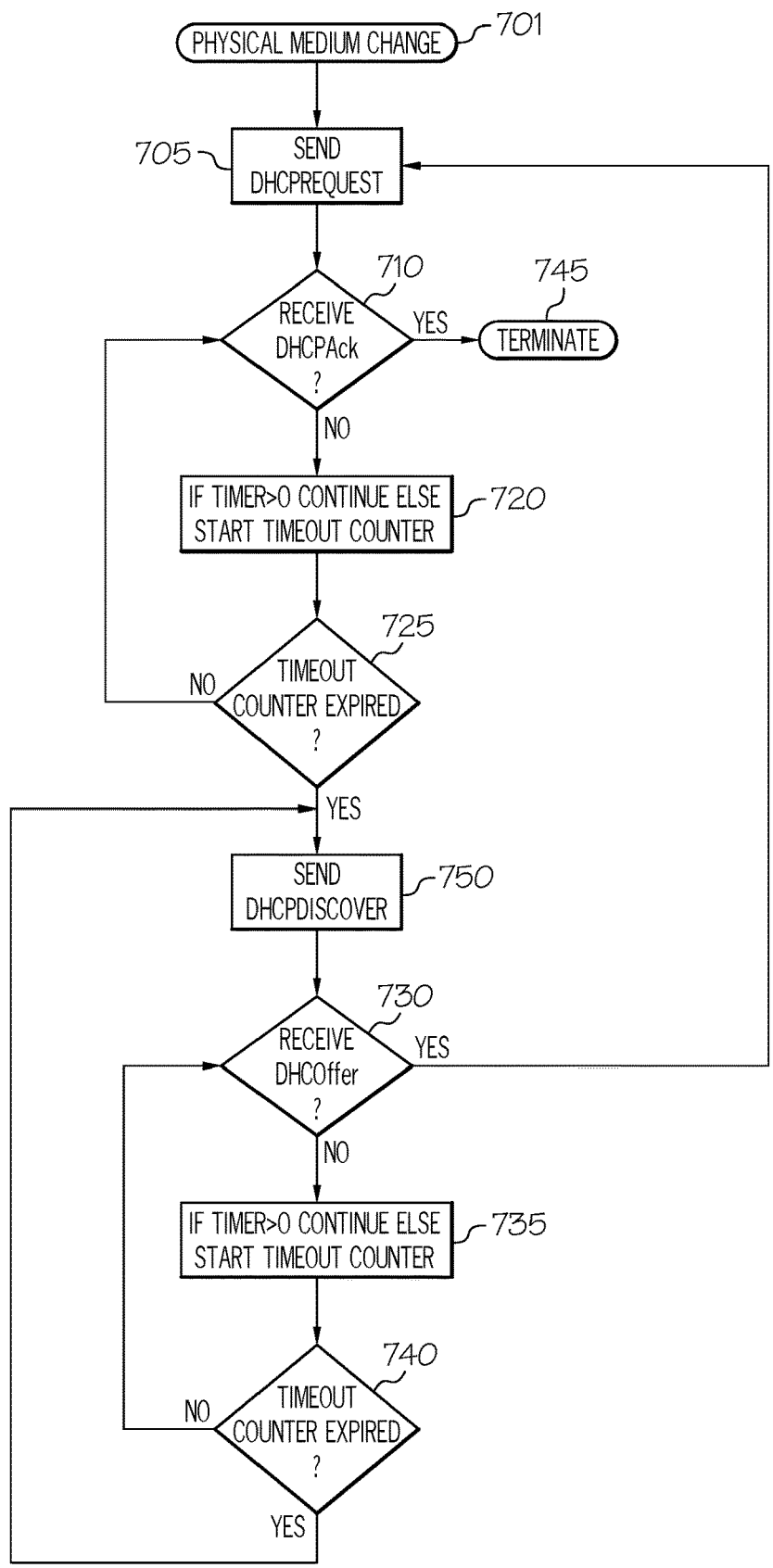
FIG. 7 is a flow chart showing acquisition of an IP address by a printer using DHCP with timeout recovery.

The process in FIG. 7 illustrates an enhancement to of the flow where printer 401 will reissue the DHCPDiscover. This process is similar to FIG. 6 for the initialization of the IP Stack. The process starts at step 701 and continues to step 705 where the printer 401 sends the host 405 a DHCPRequest. At step 710, the printer 401 determines whether a DHCPAck has been received; if yes the process completes at 745 with the printer obtaining a new IP address. If the printer 401 did not receive a DHCPAck at 710, a timeout timer is started at step 720. If the counter is already running, nothing is done. It is important to note that a timeout timer can have a different value depending on the physical medium. At step 725, if the timer is not expired, the process returns to step 710 to determine if a DHCPAck has been received. If the timer is expired, the path follows to 750 and the DHCPDiscover is issued. The process flow is now similar to FIG. 5. At step 730, the printer 401 determines if a DHCPAck was received from the server 405. If yes, the flow returns to 705 to send the DHCPRequest. If not, a timeout counter is started at step 735. The next check at step 740 is whether the counter has expired. The "no" path returns to 730 to determine if a DHCPAck was received from server 405. The "yes" path returns to 750 to reissue the DHCPDiscover.

Routing the process flow of the IP Stack initialization, when a physical medium change results in a different subnet mask, back to the DHCPDiscover, as illustrated in FIG. 7, ensures a smooth process for the user of a host application. No power cycle of the printer is required to change physical mediums.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

What is claimed is:

1. A method of changing from a first interface of a printer to a second interface of a printer, comprising the steps of:
   a. connecting the first interface of the printer to a first network having a first data host configuration protocol server;
   b. sending a DHCPDiscover message from the printer to the first server and checking if a DHCPoffer message has been received by the printer and setting an offer timeout counter if the DHCPoffer message has not been received from the first server;
   c. receiving a DHCPOffer message from the first server using the printer including a first IP address;
   d. sending a DHCPRequest message from the printer to the first server accepting the first IP address;
   e. receiving a DHCPAck message from the first server using the printer;
   f. connecting the second interface of the printer to a second network having a second data host configuration protocol server;

wherein the first interface and the second interface have different media access control addresses;

g. sending a DHCPRequest message from the printer to the second server accepting a second IP address;

h. determining if an DHCPAck message has been received by the printer from the second server and setting a timeout time if the DHCPAck message has not been received;

i. upon expiration of the timeout time, sending a DHCPDiscover message from the printer to the second server;

j. receiving a DHCPOffer message from the second server using the printer including the second address;

k. sending a DHCPRequest message from the printer to the first server accepting the second IP address; and l. receiving a DHCPAck message from the second server using the printer.

2. The method of claim 1, wherein the first interface is a wireless interface and the second interface is a wired interface.

3. The method of claim 2, wherein the wired interface is an Ethernet interface.

4. The method of claim 3, wherein the wireless interface is an IEEE 802.11 specification interface and the Ethernet interface is an IEEE 802.3 interface.

5. The method of claim 2, wherein the wireless interface is an IEEE 802.11 specification interface.

6. The method of claim 1, further comprising the step of checking if a DHCPoffer message has been received by the printer after step i. and setting an offer timeout time if the DHCPoffer message has not been received from the second server.

7. A system for printing comprising:

a. a first network including a first data host configuration protocol server;

b. a second network including a first data host configuration protocol server;

c. a printer having a first interface configured to selectively connect to the first network and a second interface configured to selectively connect to the second network such that the first and second interfaces are on different subnets, said printer also configured to:
   i) send a DHCPDiscover message to the first server;
   ii) receive a DHCPOffer message from the first server including a first IP address;
   iii) send a DHCPRequest message to the first server accepting the first IP address;
   iv) receive a DHCPAck message from the first server;
   v) send a DHCPRequest message to the second server accepting a second IP address;
   vi) determine if an DHCPAck message has been received from the second server and set a timeout time if the DHCPAck message has not been received;
   vii) upon expiration of the timeout time, send a DHCPDiscover message from the printer to the second server;
   viii) receive a DHCPOffer message from the second server including the second address;
   ix) send a DHCPRequest message to the first server accepting the second IP address; and
   x) receive a DHCPAck message from the second server using the printer.

8. The system of claim 7, further comprising a first host computer on the first network and a second host computer on the second network.

9. The system of claim 7, wherein the first interface is a wireless interface and the second interface is a wired interface.

10. The system of claim 9, wherein the wired interface is an Ethernet interface.

11. The system of claim 10, wherein the wireless interface is an IEEE 802.11 specification interface and the Ethernet interface is an IEEE 802.3 interface.

12. The method of claim 9, wherein the wireless interface is an IEEE 802.11 specification interface.

13. A printer comprising:

a. a first interface configured to selectively connect to a first network having a first data host configuration protocol server;

b. a second interface configured to selectively connect to a second network having a second data host configuration protocol server such that the first and second interfaces are on different subnets;

c. a control system configured to:
   i) send a DHCPDiscover message to the first server;
   ii) receive a DHCPOffer message from the first server including a first IP address;
   iii) send a DHCPRequest message to the first server accepting the first IP address;
   iv) receive a DHCPAck message from the first server;
   v) send a DHCPRequest message to the second server accepting a second IP address;
   vi) determine if an DHCPAck message has been received from the second server and set a timeout time if the DHCPAck message has not been received;
   vii) upon expiration of the timeout time, send a DHCPDiscover message from the printer to the second server;
   viii) receive a DHCPOffer message from the second server including the second address;
   ix) send a DHCPRequest message to the first server accepting the second IP address; and
   x) receive a DHCPAck message from the second server using the printer.

14. The printer of claim 13, wherein the first interface is a wireless interface and the second interface is a wired interface.

* * * * *